(12) United States Patent
Kriaras et al.

(10) Patent No.: US 7,002,935 B2
(45) Date of Patent: Feb. 21, 2006

(54) REAL TIME DATA TRANSMISSION SYSTEMS AND METHODS

(75) Inventors: Ioannis Kriaras, Bradenstoke (GB); Sudeep Kumar Palat, Grange Park (GB); Hatef Yamini, Swindon (GB); Jin Yang, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 763 days.

(21) Appl. No.: 09/855,146

(22) Filed: May 14, 2001

(65) Prior Publication Data

US 2002/0015391 A1     Feb. 7, 2002

(30) Foreign Application Priority Data

May 19, 2000   (EP) .................................. 00304266

(51) Int. Cl.
   *H04Q 7/00*   (2006.01)
(52) U.S. Cl. ...................... 370/328; 370/392; 370/401; 370/475
(58) Field of Classification Search ................ 370/310, 370/328, 331, 389, 392, 401, 913
   See application file for complete search history.

(56) References Cited

U.S. PATENT DOCUMENTS

| | | | | |
|---|---|---|---|---|
| 5,970,059 A |  | 10/1999 | Ahopelto et al. ............ 370/338 |
| 5,978,386 A |  | 11/1999 | Hamalainen et al. ........ 370/466 |
| 6,195,705 B1 | * | 2/2001 | Leung .......................... 709/245 |
| 6,385,451 B1 | * | 5/2002 | Kalliokulju et al. ......... 455/437 |
| 6,466,556 B1 | * | 10/2002 | Boudreaux et al. .......... 370/331 |
| 6,477,644 B1 | * | 11/2002 | Turunen ...................... 713/161 |
| 6,487,406 B1 | * | 11/2002 | Chang et al. ............. 455/422.1 |
| 6,487,595 B1 | * | 11/2002 | Turunen et al. ............. 709/226 |
| 6,487,605 B1 | * | 11/2002 | Leung ......................... 709/245 |
| 6,577,862 B1 | * | 6/2003 | Davidson et al. ........... 370/433 |
| 6,584,098 B1 | * | 6/2003 | Dutnall ........................ 370/354 |
| 6,636,502 B1 | * | 10/2003 | Lager et al. ................. 370/352 |
| 6,708,031 B1 | * | 3/2004 | Purnadi et al. ............. 455/436 |
| 6,711,147 B1 | * | 3/2004 | Barnes et al. ............... 370/338 |
| 6,768,726 B1 | * | 7/2004 | Dorenbosch et al. ....... 370/331 |
| 6,807,166 B1 | * | 10/2004 | Ohura ......................... 370/352 |

FOREIGN PATENT DOCUMENTS

| WO | WO 98/06204 | 2/1998 |
|---|---|---|
| WO | WO 99/12329 | 3/1999 |

OTHER PUBLICATIONS

Media Gateway Control Protocol And Voice Over IP Gateways, L.P. Anquetil et al. XP-000830045, pp. 151-157.
IP Mobility Support With IP-Squared (IP2) Encapsulation Technique, Okanoue et al, XP-000723089, IEICE Trans.on Communications, vol. 80-b No. 8, pp. 1198-1206.
European Search Report dated Oct. 26, 2000.

* cited by examiner

*Primary Examiner*—Brian Nguyen
*Assistant Examiner*—Tri H. Phan (57) ABSTRACT

A real time data transmission method is used in a network in which a real time media gateway is provided to allow access to the internet backbone in addition to the usual GPRS specific gateway. The method involves changing the header in a real time data stream as it passes through the network so that it can pass directly to the real time gateway without passing through the GPRS specific gateway. This ensures that the data stream travels along a more direct route and shortens the headers used in the data stream in the process.

3 Claims, 7 Drawing Sheets

REAL TIME DATA TRANSMISSION SYSTEMS AND METHODS

CROSS-REFERENCE TO RELATED APPLICATION

This application claims priority of European Patent Application No. 00304266.0, which was filed on May 19, 2000.

1. Field of the Invention

The present invention relates to real time data transmission systems and methods.

2. Background of the Related Art

Figure 1:
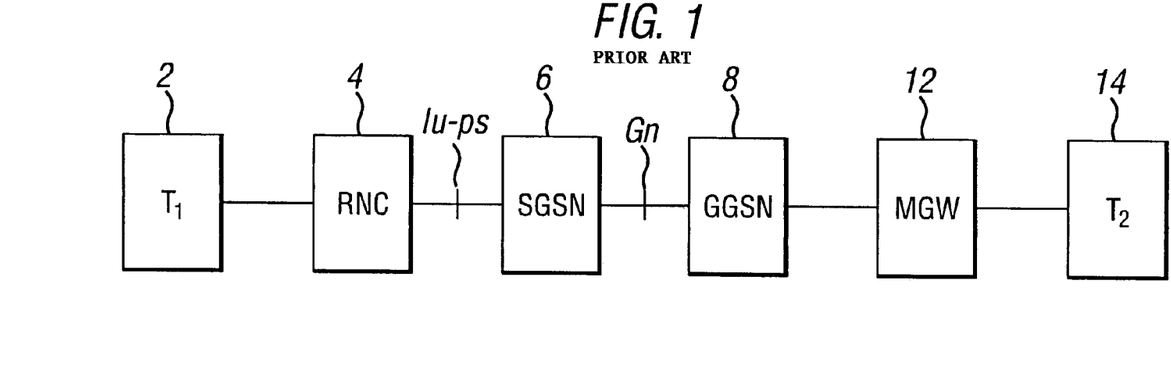
FIG. 1 is a block diagram of the main components of an existing network.

The structure of telephone networks employing third generation internet protocol industrial focus group architecture (3G IP) and third generation partnership project architecture (3G PP) is such that any voice over internet protocol traffic (VoIP) goes through a fairly lengthy route within the network. Thus, for example as shown in FIG. 1, VoIP traffic originating at a mobile station ($T_1$) 2 and destined for a target station ($T_2$) 14 takes the following route; starting from the mobile station 2, traffic is passed by a radio network controller (RNC) 4 to a serving GPRS (general packet radio system) support node SGSN 6. From there the signal is passed by a gateway GPRS support node (GGSN) 8 to a media gateway (MGW) 12 to interwork with a public switch telephone network (PSTN) is met or when transcoding is required, following which the destination of the target telephone ($T_2$) 14 is reached.

The traffic handling using the path as outlined above can be very inefficient.

So far there is no co-ordination between choice of GGSN and VoIP media gateway (MGW). The determination of GGSN (when setting up PDP bearer) and choice of MGW (determined by application level call control) are two independent procedures. However, as the traffic has to pass these two points, the determined GGSN and MGW can result in a less than optimum traffic route. For example, this would happen when the mobile station (MS) GGSN and MGW form a triangle.

In the public land mobile network (PLMN) (eg the mobile telephone operators network) traffic has to pass through a first interface In-ps between the RNC 4 and the SGSN 6, a second interface Gn between the SGSN 6 and the GGSN 8. As a result, the header of each signal packet acquired the following protocol stack or series of codes. Real time transport protocol/user datagrams protocol/internet protocol/GPRS tunnelling protocol/user datagram protocol/internet protocol/L1,2 (RTP/UDP/IP/GTP/UDP/IP/L1,2). The result is that for real time or voice services, the resource usage is low (about 25%).

This problem is overcome by a new mobile telephone system architecture also described in copending patent application filed on the same date and by the present applicant. The problem with this system is that new protocols have to be introduced.

It is an object of the present invention to provide an improved real time data transmission system in which the protocol overhead is reduced.

SUMMARY OF THE INVENTION

According to the present invention there is provided a real time data transmission system for uplink and downlink transmissions between a mobile station and a destination station, the mobile station in the uplink transmission adding to the payload data stream by generating a header containing its own identity and the destination identity to accompany the payload in the data stream, a radio network controller upon receiving the data stream adding to the header a tunnel identity obtained from a serving general packet radio system support node (SGSN) to identify the data stream and then directing the data stream directly to a media gateway, the media gateway in the downlink transmission receiving a data stream including a header containing the mobile station identity and the mobile station input port identity obtained from the call control system, the media gateway acting to replace both the mobile station identity and the input port, identity in the header with the internet-protocol (IP) address of the radio network controller, the input port identity and a tunnel identity for identifying the data stream, all obtained from the call control system and then directing the data stream directly to the radio network controller, the radio network controller acting to replace the radio network control address in the header with the mobile station identity address and input port identity both obtained from the call control system and responding to the tunnel identity data received to identify the data stream and then to direct the data stream to a corresponding radio bearer linking it to the mobile station.

According to the present invention there is further provided a real time data transmission method in a network including a mobile station, a radio network controller, a media gateway, a destination station and a call control system and in which the passage of a data stream including a header section and payload section between the mobile station and the destination station is governed by the content of the header section, the method comprising, in the uplink transmission from the mobile station to the destination station, the step of adding to the header section of the data stream transmitted from the mobile station to the radio network controller, the identities of both stations, the step of adding to the header of the data stream passing through the radio network controller a tunnel identity obtained from the call control system, the step of forwarding the data stream from the radio network controller to the media gateway, and in the down transmission from the destination station to the mobile station the step of adding to the header of the data stream passing from the destination station, the mobile station identity and port identity both obtained from the call control system, the step of replacing the mobile station identity and port identity in the header of the data stream with the radio network controller address, the input port identity and the tunnel identity for the data stream all obtained from the call control system, as the data stream passes through the media gateway, the step of forwarding the data stream to the radio network controller, the step of replacing the radio network control address and port identity in the header of the data stream with the mobile system address and input port, both obtained from the call control system as the data stream passes through the radio network controller, and the step of directing the data stream to the mobile station.

According to the present invention there is still further provided a real time data transmission method in a network including a mobile station, a radio network controller, a media gateway, a destination station and a call control system and in which the passage of a data stream including a header section and payload section between the mobile station and the destination station is governed by the content of the header section, the method comprising the step of replacing at least some of the address related material in the header section as it passes from one location in the network to another location, with internal addresses related material whereby to reduce the pathway of the data stream through the network and the proportion of the size of the header section relative to the payload section.

BRIEF DESCRIPTION OF THE DRAWINGS

A telephone network embodying the present invention, will now be described, by way of example, with reference to the accompanying diagrammatic drawings, in which.

DETAILED DESCRIPTION

Figure 2:
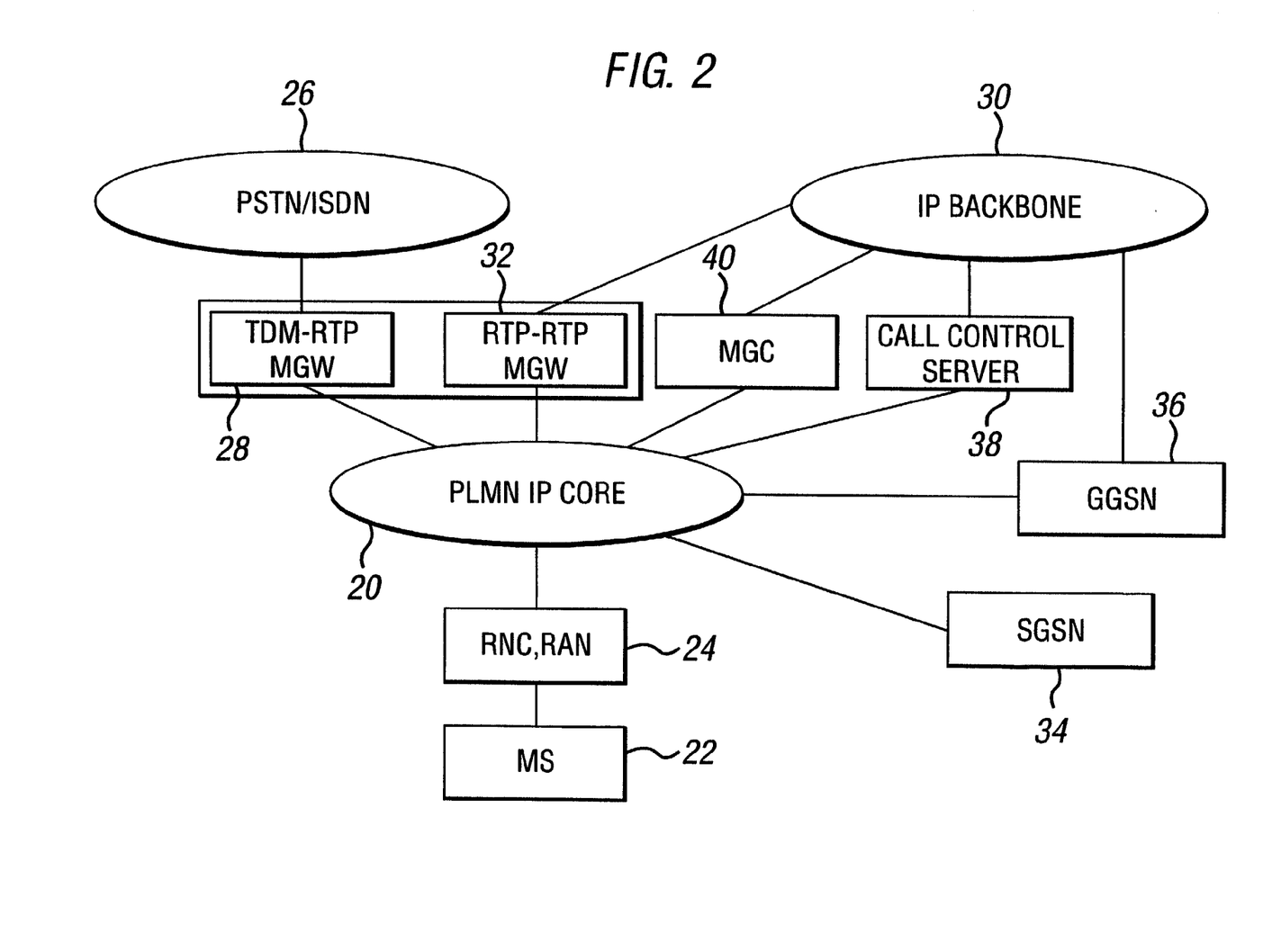
FIG. 2 is a block diagram of a network described in copending patent application, showing the physical connections between the main components of the network.

The network of the copending patent application which is shown in FIG. 2 includes a PLMN internet protocol (IP) core or cloud 20. This core 20 is communicating to a mobile station 22 through a radio network controller (RNC)/radio access network (RAN) 24. The PLMN IP core 20 is coupled to public switched telecommunication network (PSTN)/ integrated services digital network (ISDN) 26 through a time division multiplexing—real time transport protocol, media gateway (TDM-RTP), MGW 28.

The PLMN IP core 20 is connected to an internet protocol IP backbone network 30 by two routes. A first route involves a real time transport protocol—real time transport protocol media gateway (RTP-RTP-MGW) 32 while the second route involves an SGSN 34, a GGSN 36. A media gateway controller 40 controls the routes.

It will thus be seen that voice internet protocol traffic can now reach the IP backbone 30 by incurring less header content.

Figure 3:
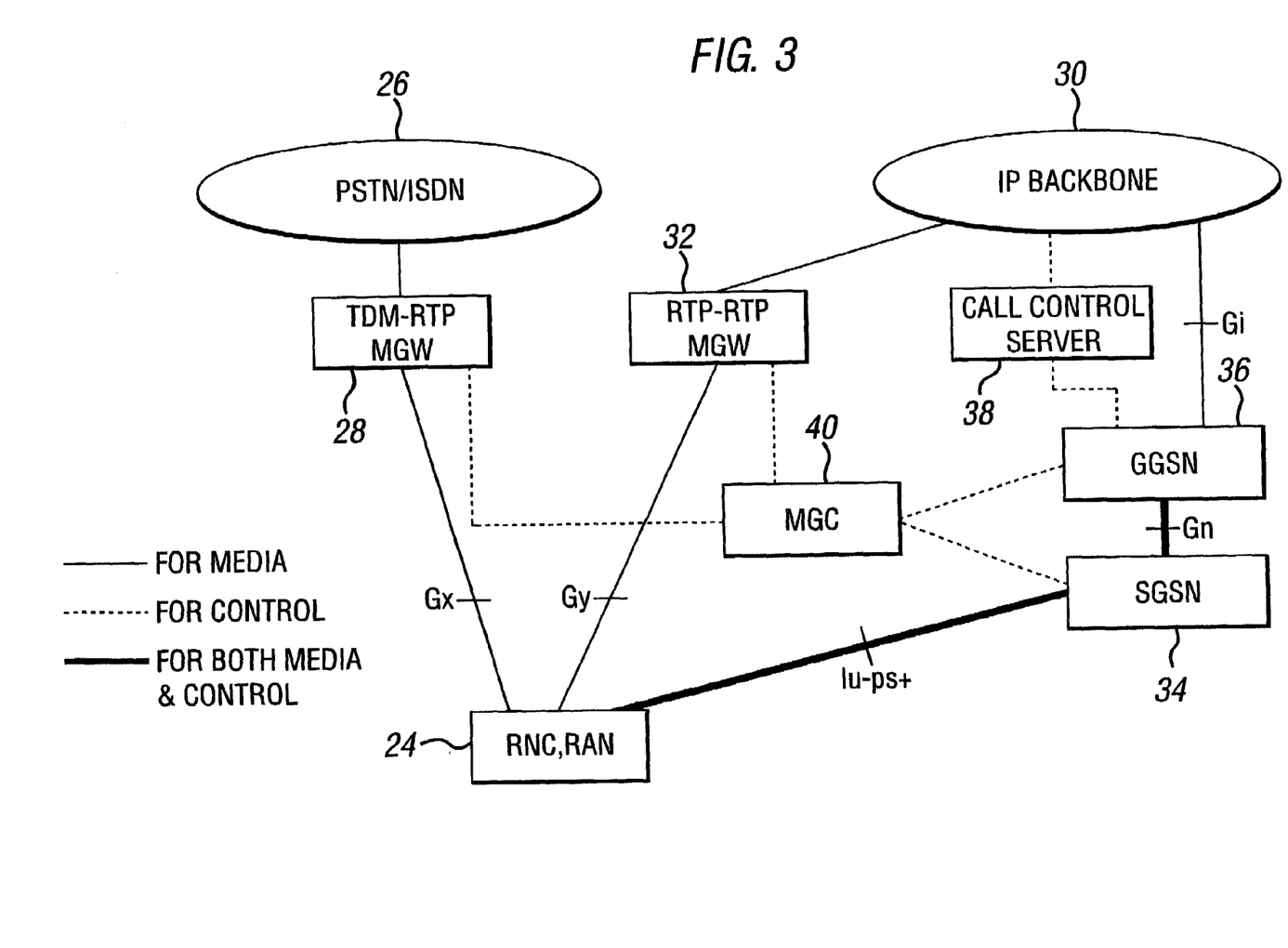
FIG. 3 is a block diagram illustrating the logical connection between the main components of the network of FIG. 2.

FIG. 3 illustrates the logical connections between the components shown in FIG. 2 with control connections being shown in broken lines, media connections being shown in a single continuous line and media and control connections being shown in parallel lines, one thick one thin.

The interfaces between the units are as follows. Gx is the interface between the RNC 24 and the MGW 28, Gy is the interface between the RNC 24 and the MGW 32. Iu-ps is the interface between the RNC 24 and the SGSN 34. Gn is the interface between the SGSN 34 and the GGSN 36 and Gi is the interface between the GGSN 36 and the IP backbone 30.

As can be seen, since the MGWs 28 and 32 are connected to the RNC 24 through the PLMN IP core 20, any MGW can talk to any RNC within a single management (mobile operators) domain.

It will be appreciated that the VoIP flow goes through one of the MGWs 28, 32 which is connected to the PLMN IP core network 20. If the call traffic is going to the PSTN/ ISDN network immediately, a RTP-PSTN gateway will be used. Otherwise, if traffic is going to another internet protocol end point which can include an PSTN/ISDN gateway, then the RTP-RTP GW 32 should be used. Both types of MGW 28 and 32 can perform transcoding functions.

The MGW for each VoIP flow will be the anchoring point during each communication session. The selected MGW can switch the VoIP flow from one RNC 24 to another in the same system under the control of the MGC 40 which itself receives instructions from the GSN 34 possibly via the GGSN 36.

DESCRIPTION OF THE PREFERRED EMBODIMENT

In order to operate the system illustrated in FIG. 2, it is necessary to implement a variety of new procedures.

In order to set up any call between a mobile station and its destination, a bearer setup as well as a call setup, needs to be implemented as will now be described.

Bearer Setup

The internet protocol (IP) bearer needs, as a first stage to setup a data session for transferring packets of data and so a packet data control PDP context is setup in the normal manner for GRPS. The context may be associated with quality of service (QoS) attributes for signalling services as required.

After the first stage of call setup procedure, a new or modified bearer (PDP context) will be required specially for the VoIP media traffic (this can be indicated by a special PDP type). This type of bearer is subject of a different treatment to normal. Neither the SGSN 34 nor the GGSN 36 needs to actually allocate resource for it, as the actual media path will go between the RNC 24 and one of the two MGWs 28, 32 directly. Only control functionality needs to be performed by the SGSN 34 and the GGSN 36. Two tunnel IDs (TID) ie GPRS tunnelling protocol identities are allocated as normal.

The SGSN 34, upon receiving the PDP context setup request for VoIP media traffic, will instruct the MGC 40 and the MGC will instruct the MGWs 28 or 32 to reserve resource between the local MGW to be used and the RNC 24.

The handling of the traffic in this bearer will be instructed and controlled by the SGSN 34 later, once the call setup procedure has been completed.

Call Setup

The call setup procedures regarding routing decision differs from the normal or standard VoIP call control procedures since they will always act to bring a local MGW into the call (traffic) path. The call routing policy is described below considering two possible scenarios.

Figure 4:
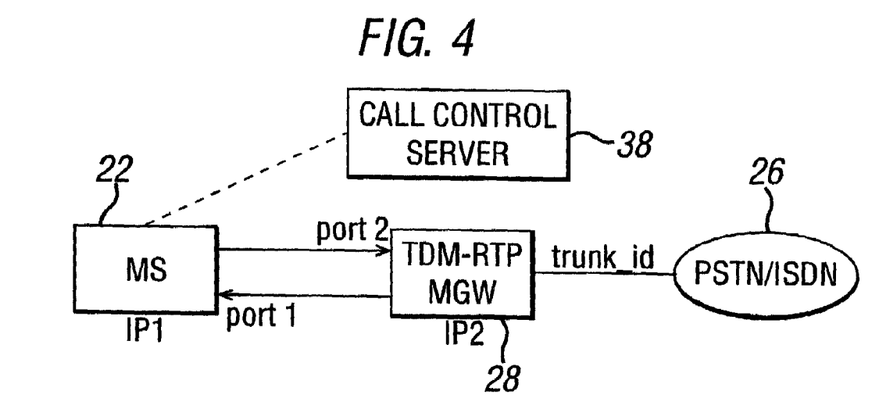
FIG. 4 is a block diagram illustrating a call set up scenario interworking with PSTN locally.

The first call setup scenario involves interworking with the PSTN/ISDN network 26 and is illustrated in FIG. 4. In setting up the call procedure, the following information needs to be obtained:

(a) the internet protocol address IP1 of the mobile station 22;

(b) the internet protocol address IP2 of the chosen media gateway 28;

(c) the user datagram protocol (UDP) port number, port 1, for downlink media traffic at the mobile station 22;

(d) the UDP port number, port 2, of the uplink media traffic at the gateway 28; and (e) the trunk member (trunk-id) of the trunk which connects the gateway 28 to the PSTN/ISDN network 22.

Where a call originates from the mobile station 22 the following high level and general procedures are implemented.

The mobile station 22 initiates a call request towards the CC (call control) server 38, which includes the called party number and its IP address (IP1).

The CC server 38 analyses the called party number and, if interworking with PSTN/ISDN network 22 locally is decided it identifies a gateway 28 (IP2) based on, for example, load balancing/capacity/supported codec.

The CC server 38 talks to the station 22 and the media gateway controller (MGC) 40 controlling the identified gateway 28 to setup media path using messages which are specific to the call signalling protocol being used and, as a result, the media path would include the gateway 28, the port numbers port 1 and port 2, and the TDM trunk number (trunk-id).

Where the call terminates at the mobile station 22, the following high level and general procedures are implemented:

A call request from the PSTN/ISDN network 22 reaches the CC server 38 via a signalling gateway (not shown) including the called party number.

The CC server 38 analyses the called party number and maps it to the IP address (IP1), of the mobile station 22 from data available locally within the CC server 38.

The CC server 38 also identifies the address (IP2) of gateway 28 based on, for example, load balancing/capacity/supported codec.

The CC server 38 talks to the mobile station 22 and the gateway controller 40 (controlling the identified media gateway 28) to setup media path using messages which are specific to the call signalling protocol being used and, as a result, the media path would include the selected gateway 28 and the port numbers port 1 and port 2, would be determined.

Figure 5:
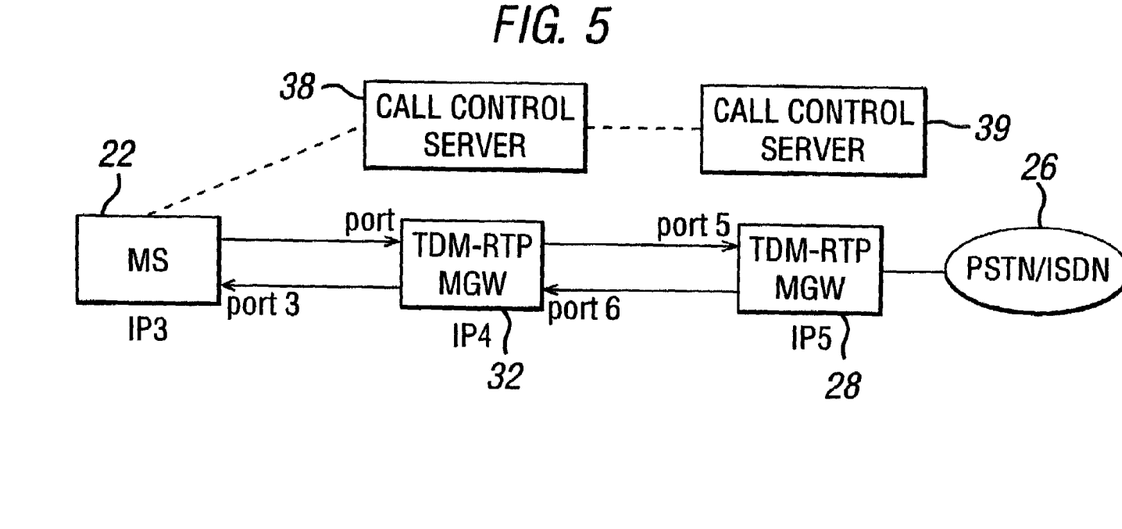
FIG. 5 is a block diagram illustrating a call set up scenario interworking with PSTN remotely.

The second call setup scenario involves interworking with the PSTN/ISDN network 22 remotely and is illustrated in FIG. 5. In this case, the second gateway 28 is involved together with its own call control (CC) server 39.

In setting up the call procedure (including call routing) the following information needs to be obtained:

(a) the internet protocol address IP3 of the mobile station 22;

(b) the internet protocol address IP4 of the local RTP-RTP media gateway 32;

(c) the internet protocol address IP5 of the remote gateway 28;

(d) the UDP port number, port 3, for downlink traffic media at the mobile station 22;

(e) the UDP port number, port 4, for the uplink media traffic at the gateway 32;

(f) the UDP port number, port 5, for the uplink media traffic at the remote gateway 28; and (g) the UDP port number, port 6, for the downlink media traffic from the network 26 to the first or local gateway 32.

For the mobile station 22 originating call, the following high level and general procedures are implemented:

The mobile station 22 initiates a call request towards the CC (call control) server 38, which includes the called party number and its IP address (IP3).

The CC server 38 then analyses the called party number to see if local interworking with PSTN network 26 is required. If not, a local gateway 32 (with address IP4) is identified by the local CC server 38.

The local CC server 38 contacts another (remote) CC server 39, which identifies a remote gateway 28 and its IP address, IP5.

The local CC server 38 talks to the station 22 and the media gateway controller 40 (controlling the local gateway 32) using messages which are specific to the call signalling protocol being used and, as a result, the media path would include the local gateway 32 and the port numbers, port 3 and port 4, would be determined.

The local CC server 38 talks to the remote CC server 39 using messages which are specific to the call signalling protocol being used and, as a result, the port numbers, port 5 and port 6, are determined.

For a mobile station 22 terminating call, the following high level and general procedures are implemented:

The call request from a remote CC server 39 reaches local CC server 38 via an IP connection including the called party number.

The local CC server 38 analyses the called party number and maps it to the mobile stations IP address (IP3).

The local CC server 38 identifies a local gateway address IP4 based on, for example, load balancing/capacity/supported codec.

The local CC server 38 talks to the remote CC server 39 using messages which are specific to the call signalling protocol being used and, as a result, the IP address IP5 of the remote gateway 28, the port number port 5 and port number port 6, are determined.

The local CC server 38 talks to mobile station 22, the media gateway controller 40 (controlling local gateway 32) using messages which are specific to the call signalling protocol being used and, as a result, the media path would include the local gateway 32 and the port numbers, port 3 and port 4, are determined.

After the above call setup procedure, the route of the call (media path) is determined (reflected by the IP addresses of various gateways and port numbers). Then the (local) CC server 38 informs the GGSN 36 and SGSN 34 about these details (the transport addresses) of the media flow, which then instruct RNC 24 and the local gateway 28 involved to transport traffic directly via PLMN IP CN (core network) 20 that is between the RNC 24 and the local media gateway 32.

As described above, the VoIP media can now be transported between the media gateway and RNC 24 directly over PLMN IP core 20, without going through the SGSN 34 and the GGSN 36. The advantages of this arrangement are that there are a reduced number of elements through which the media streams have to go and the media transport between the media gateway and the RNC 24 can be over a shorter protocol stack and thus result in a reduced protocol overhead.

To optimise the transport of the traffic, two independent schemes will now be described.

The first scheme involves data stream identification based on GPRS tunnelling protocol identification (GTP TID) and operates as follows.

After being informed, the established VoIP traffic path (transport addresses) the SGSN 34 identifies the two TIDs (GTP tunnel ID) corresponding to the uplink and downlink traffic path for the established VoIP session. Then the SGSN 34 can control RNC 24 and the (local) MGW (via a media gateway controller) to handle the media traffic specially in an optimised way, which is described below.

For uplink traffic handling, the SGSN 34 informs RNC 24, the GTP TID which is the tunnel ID for the uplink traffic of the VoIP session. The RNC 24 obtaining this TID, then can handle the traffic arriving from a particular RAB that is associated with the TID. The traffic handling for this RAB is as follows (shown in FIG. 6).

Figure 6:
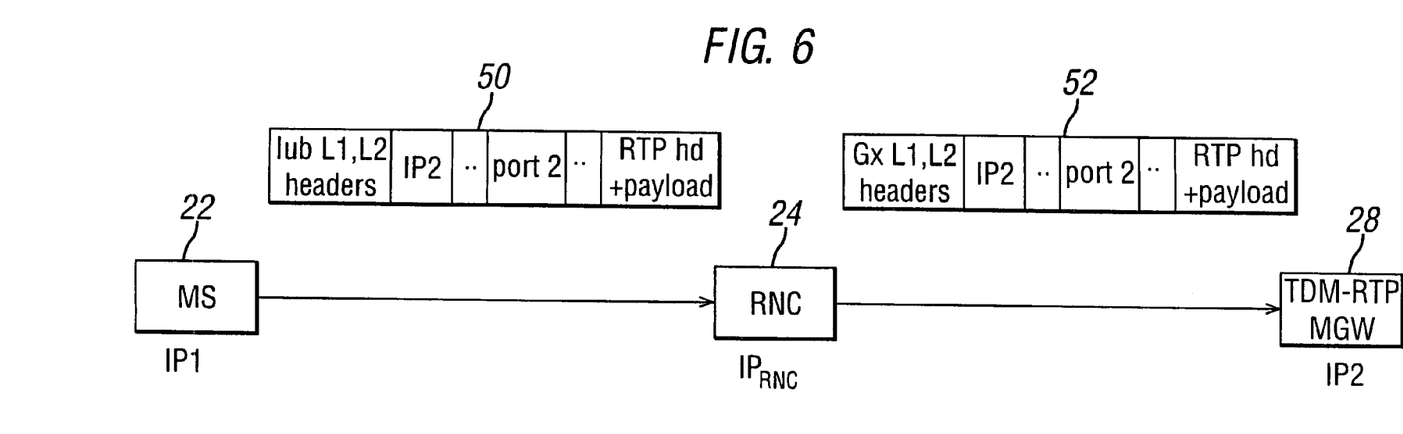
FIG. 6 is a block diagram illustrating uplink traffic handling.

A VoIP packet 50 arrives at the RNC from the mobile station 22 via a node B as normal. For each packet, the RNC 24 strips off the L1 and L2 headers and gets the user level IP packet. This user level IP packet will be routed towards the local MGW 28 using normal IP routing scheme (as a result the L1 and L2 headers over Gx interface will be used).

Figure 7A:
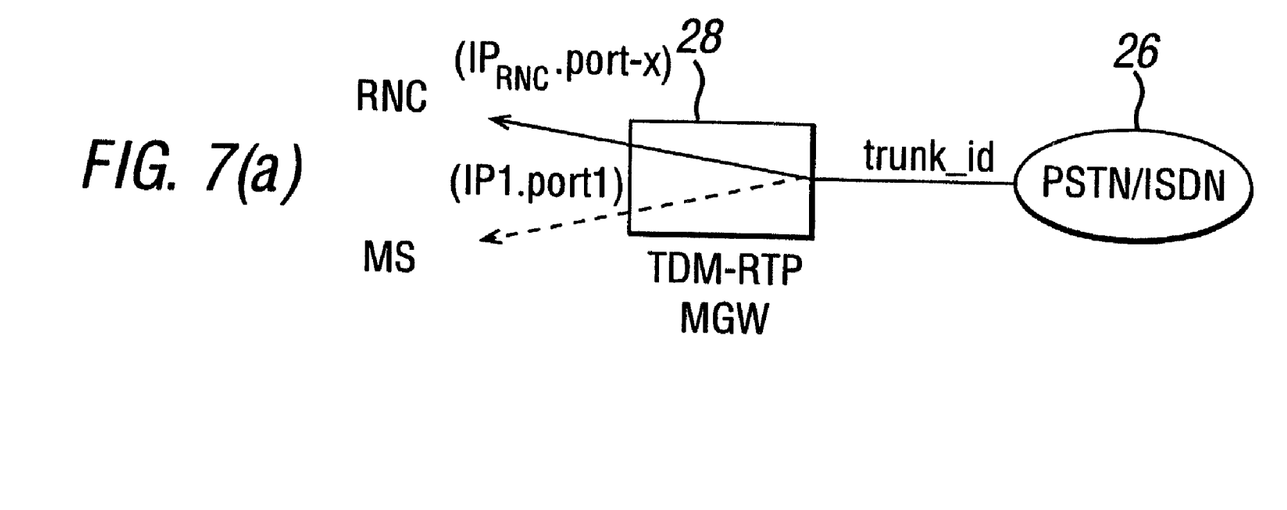
FIG. 7 is a block diagram illustrating downlink traffic handling at a local media gateway.

The downlink traffic handling needs to be done at the local media gateway and the RNC 24. For traffic handling at the media gateway, the SGSN 34 via the GGSN 36 instructs the local gateway to take the following action:

If the local media gateway is a TDM-RTP MGW, the connection between the TDM trunk and (IP1, port 1) needs to be switched to ($IP_{RNC}$, port-x), as shown in FIG. 7a. The port number port-x is determined by the local MGW or any other means as long as no conflicting use.

Figure 7B:
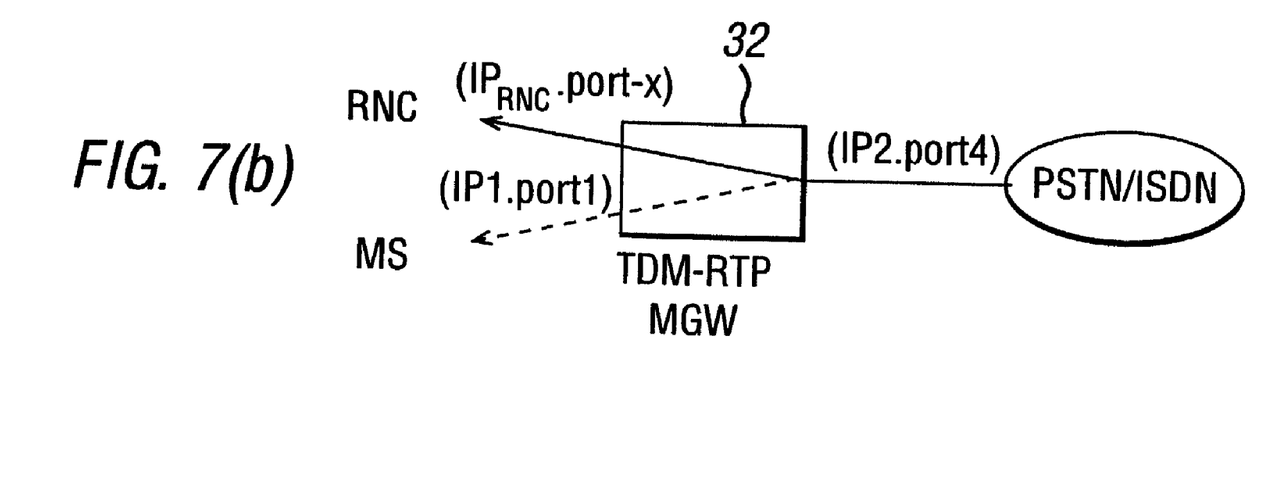

If the local media gateway is a RTP-RTP MGW, the connection between the incoming RTP stream at the MGW and the (IP1, port 1) needs to be switched to ($IP_{RNC}$, port-x) as shown in FIG. 7(b). The port number port-x is determined by the local MGW or any other means as longs as no conflicting use.

SGSN 34 then informs the local MGW with the TID which is the tunnel ID for the downlink traffic of the VoIP session. The local MGW then inserts this TID into each downlink real time transport protocol (RTP) packet of this connection. The TID (4 bytes) can be inserted as an extended RTP header field or using an existing RTP header field. The RTP after extended or reused header is designated as RTP+.

Figure 8:
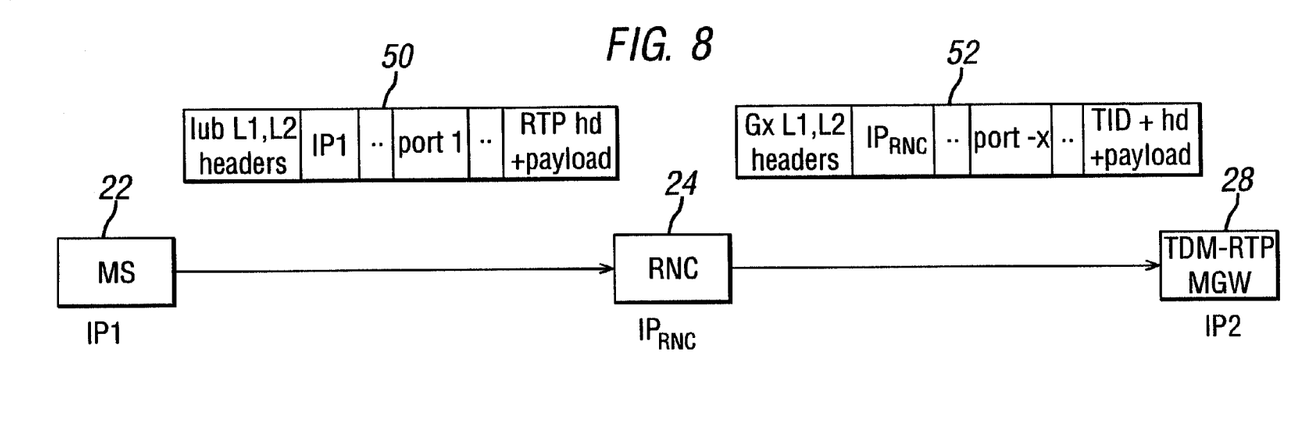
FIG. 8 is a block diagram illustrating downlink traffic handling at a radio network controller.

At the RNC 24, the downlink traffic is handled as follows (shown in FIG. 8):

The SGGN 34 informs the RNC 24 with the TID which is the tunnel ID for the downlink traffic of the VoIP session and the destination transport address (IP1, port 1). The RNC 24 holds this mapping for later use.

For each RTP+/UDP/IP packet coming from local media gateway, the TID inserted by the gateway is checked and mapped to a destination transport address (IP1, port 1). Then the TID field is removed or a proper value is set if the RTP is reused (thus the original RTP packet is recovered). The user datagram protocol (UDP) destination port number is replaced with port 1 and the IP destination address is set to IP1. The new RTP/UDP/IP packet is put in a RAB, which is associated with the TID.

The second scheme involves stream identification base on port number and operates as follows:

After being informed of the established VoIP traffic path (transport addresses), the SGSN 34 can control RNC 24 and the local media gateway (via a gateway controller) to handle the media traffic specially in an optimised way. The uplink traffic handling is exactly the same as in the first scheme (using TID for stream identification) but the downlink handling is different.

The downlink traffic handling needs to be done at the local gateway (MGW) and RNC 24, which is implemented as follows:

For handling at the local media gateway, the SGSN 34 via the GGSN 36 instructs the local gateway as follows:

If the local media gateway is a TDM-RTP MGW, the connection between the TDM trunk and (IP1, port 1) is switched to ($IP_{RNC}$, port-x) as shown in FIG. 7(a). The port number port-x is provided by the SGSN 34.

If the local media gateway is a RTP-RTP MGW, the connection between the incoming RTP stream at the media gateway and (IP1, port 1) is switched to ($IP_{RNC}$, port-x) as shown in FIG. 7(b). The port number port-x is provided by the SGSN 34 or the GGSN 36.

Figure 9:
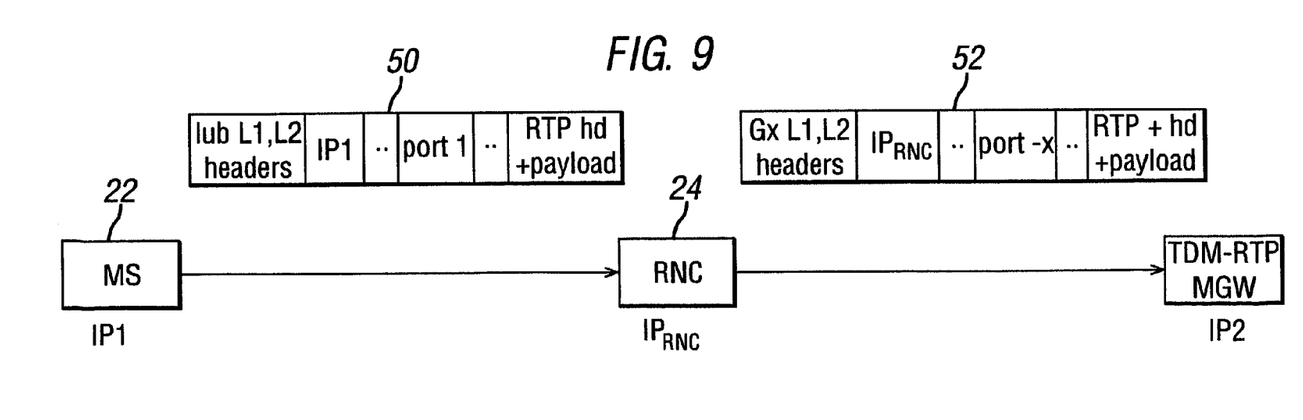
FIG. 9 is a block diagram illustrating downlink traffic handling using a port number based scheme at the radio network controller.

At the RNC 24, the downlink traffic is handled as follows (shown in FIG. 9):

The SGSN 34 provides the RNC 24 with the following information: the TID which is the tunnel ID for the downlink traffic of the VoIP session, the destination transport address (IP1, port 1), and the port number port-x assigned by the SGSN 34 for this VoIP session. The RNC 24 holds this information for later use.

For each RTP/UDP/IP packet coming from the local media gateway, the UDP port number (port-x) is checked and mapped to a destination transport address (IP1, port 1). The UDP destination port number is replaced with port 1 and IP destination address is set to IP1. The new RTP/UDP/IP packet is then put in a RAB, which is associated with the TID.

Figure 10:
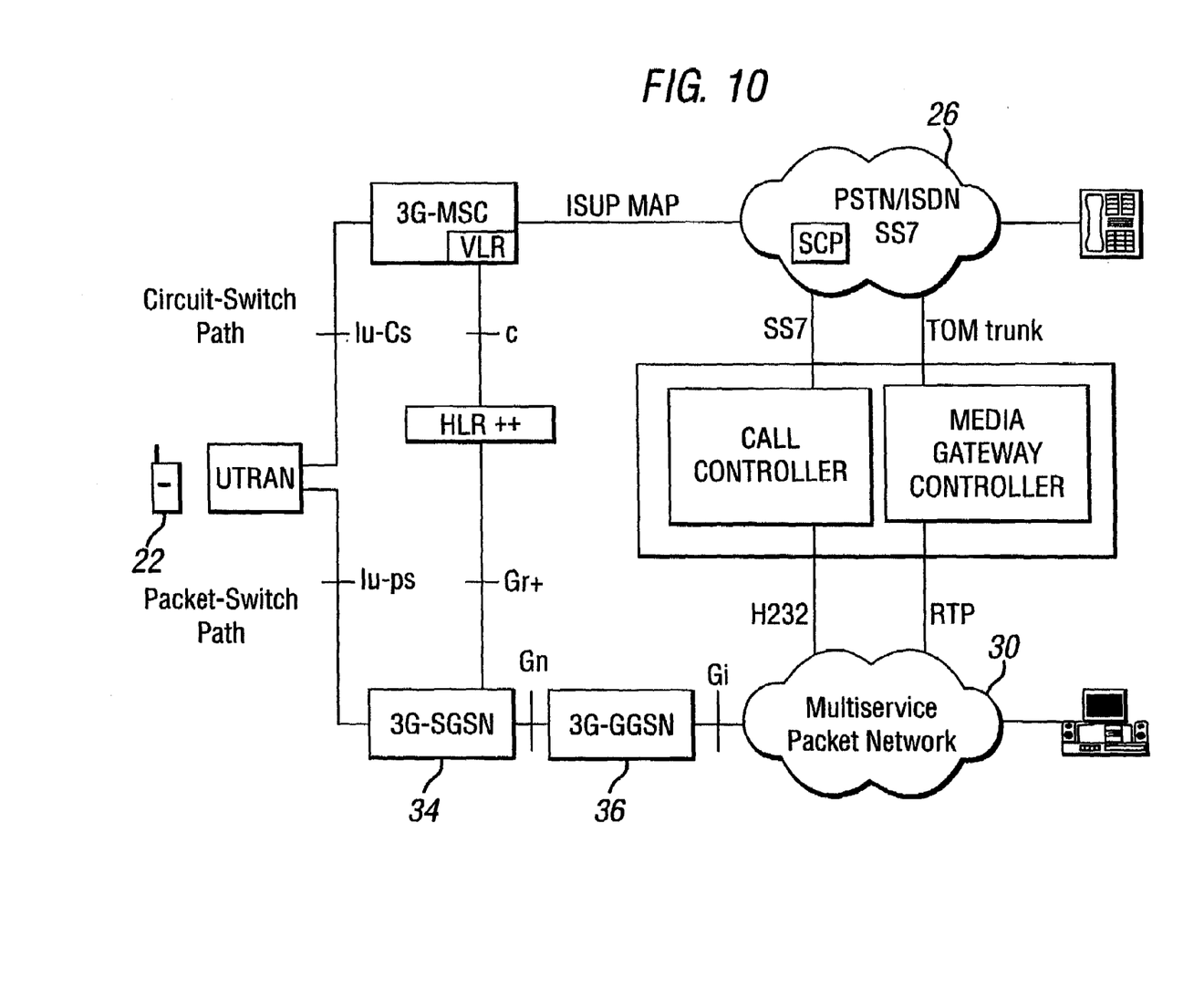
FIG. 10 is a block diagram of the two paths for voice service in a universal mobile telephone system UMTS.

The current architecture for supporting VoIP in universal mobile telephone system (UMTS) is to overlay a VoIP service domain on UMTS PS domain (see FIG. 10). The VoIP service domain contains several components including CSCF (call state control function)/signalling gateway.

The CSCF provides call control functionality and supplemental features (eg call forwarding, call waiting and multiple way call).

The CSCF will provide functions including addressing translation, admission control such as permission to complete call and set bandwidth limitations, management and control of gateways and call signalling, call management, reporting and logging.

The signalling gateway provides signalling interworking and an interface to the PSTN/ISDN network.

The media gateway will provide many services including protocol and media translation. This entity will perform bidirectional synchronous/asynchronous conversion (TDM to packet) and signalling interworking functions including control (SS7) interface/connection management.

Changes may be made in the combination and arrangements of the elements as hereinbefore set forth in the specification and shown in the drawings, it being understood that changes may be made in the embodiment disclosed without departing from the spirit and scope of the invention and defined in the following claims.

What is claimed is:

1. A real time data transmission system for uplink and downlink transmissions between a mobile station and a destination station, the mobile station in the uplink transmission adding to a payload data stream by generating a header containing its own identity and a destination identity to accompany the payload in the data stream, a radio network controller upon receiving the data stream adding to the header a tunnel identity obtained from a call control system to identify the data stream and then directing the data stream directly to a media gateway, the media gateway in the downlink transmission receiving a data stream including a header containing the mobile station identity and a mobile station input port identity obtained from a serving general packet radio system support node (SGSN), the media gateway acting to replace both the mobile station identity and the input port identity in the header of the received downlink data stream with an address of the radio network controller, the input port identity and the tunnel identity for identifying the received downlink data stream, all obtained from the call control system and then directing the received downlink data stream directly to the radio network controller, the radio network controller acting to replace the radio network controller address in the header of the received downlink data stream with the mobile station identity address and input port identity both obtained from the call control system via the SGSN and responding to the tunnel identity data received to identify the received downlink data stream and then to direct the received downlink data stream to a corresponding radio bearer linking it to the mobile station.

2. A real time data transmission method in a network including a mobile station, a radio network controller, a media gateway, a destination station and a call control system and in which a passage of a data stream including a header section and payload section between the mobile station and the destination station is governed by content of the header section, the method comprising, in the uplink transmission from the mobile station to the destination station, the step of adding to the header section of the data stream transmitted from the mobile station to the radio network controller, the identities of both stations, the step of adding to the header of the data stream passing through the radio network controller a tunnel identity obtained from the call control system, the step of forwarding the data stream from the radio network controller to the media gateway, and in the down transmission from the destination station to the mobile station the step of adding to the header of the data stream passing from the destination station, the mobile station identity and port identity both obtained from the call control system, the step of replacing the mobile station identity and port identity in the header of the data stream with the radio network controller address, the input port identity and the tunnel identity for the data stream all obtained from the call control system, as the data stream passes through the media gateway, the step of forwarding the data stream to the radio network controller, the step of replacing the radio network control address and port identity in the header of the data stream with the mobile station address and input port, both obtained from the call control system via an SGSN as the data stream passes through the radio network controller, and the step of directing the data stream to the mobile station.

3. A method according to claim 2, including the step of causing the radio network controller to respond to the tunnel identity data received from the call control system to identify the data stream received and to direct it along a corresponding radio bearer linking it to the mobile station.

* * * * *